United States Patent [19]

Ooki et al.

[11] 4,334,159
[45] Jun. 8, 1982

[54] SLIP RING COOLING DEVICES FOR ELECTRICAL ROTARY MACHINES

[75] Inventors: Norihiro Ooki, Katsuta; Shoji Motegi; Masatoshi Watanabe, both of Hitachi, all of Japan

[73] Assignee: Hitachi, Ltd., Tokyo, Japan

[21] Appl. No.: 154,478

[22] Filed: May 29, 1980

[30] Foreign Application Priority Data

May 29, 1979 [JP] Japan .................................. 54/65616

[51] Int. Cl.³ .............................................. H02K 9/28
[52] U.S. Cl. ..................................... 310/54; 310/227; 310/232
[58] Field of Search ......................... 310/227, 54, 232

[56] References Cited

U.S. PATENT DOCUMENTS 3,526,794  9/1970  Glider et al. ........................... 310/54
3,784,855  1/1974  Motegi et al. ........................ 310/227

FOREIGN PATENT DOCUMENTS 690690   4/1940  Fed. Rep. of Germany .
1763302  10/1971  Fed. Rep. of Germany .
49-74308  7/1974  Japan .
517403   2/1972  Switzerland .

Primary Examiner—J. V. Truhe
Assistant Examiner—Morris Ginsburg
Attorney, Agent, or Firm—Thomas E. Beall, Jr.

[57] ABSTRACT

A slip ring cooling device for electrical rotary machine comprises a plurality of closed chambers axially extending in the peripheral portion with intervals therebetween in the peripheral direction, and an annular passage at one side. The closed chambers each are defined by the surfaces of holes made in the slip ring so as to axially extend at the peripheral portion of the slip ring. The axially extended holes have open ends and closed ends. The annular passage is fluidly connected to each of said open ends so that said closed chambers communicate with said annular passage. A volatile liquid poured in said passage is distributed uniformly to each of said closed chambers by centrifugal force applied thereon upon the rotation of the slip ring. The distributed liquid is evaporated by the slip ring and brushes contacting the slip ring to form vapor. The vapor is transferred to the lower temperature portion by the pressure difference to be cooled and condensed, whereby the slip ring is cooled.

13 Claims, 3 Drawing Figures

SLIP RING COOLING DEVICES FOR ELECTRICAL ROTARY MACHINES

BACKGROUND OF THE INVENTION

This invention relates to slip ring cooling devices for electrical rotary machines, and more particularly to slip ring cooling devices suitable for electrical rotary machines of large capacity such as turbine generators, water turbine generators, etc.

As well known, forced draft cooling is adopted widely for cooling a slip ring except for particular cases such as oil cooling or water cooling. As size of the electrical rotary machines increases these days, field magnet currents also increase and there is an increase in numbers of brushes to be mounted on one slip ring, resulting in the brushes being crowded. Under such a condition, passages for the draft are restrained by the crowded brushes so that all the brushes cannot be cooled uniformly and well enough. Under such a condition, frictional characteristics, of the brush and electric currents flowing there become unbalanced on account of the unbalanced brush temperature. As a result, partial, abnormal wear and sparks in the brushes are induced, which phenomena extend to the other normal brushes successively, which causes such a serious accident as the electrical rotary machine can not be operated.

In order to solve such a defect, in conventional machines of this kind, slip rings are cooled by using a plurality of heat pipes inserted therein for effecting the heat transfer in the axial direction, in addition to the forced draft cooling means. This device is disclosed in Japanese Laying-open of patent application No. 49-74308.

In this Japanese Laying-open of patent application No. 4,974,308, the forced draft cooling means is used for cooling a slip ring and brushes, and further in order to cool the slip ring, so-called heat pipes are employed. In this construction, the slip ring has a plurality of holes formed axially in the peripheral portion. In these holes, there are inserted a plurality of pipes sealingly enclosing condensed liquid which has a large evaporation latent heat, which are called the heat pipes. The heat pipes are fixed to the slip ring through end plates disposed on both the sides. Each of the heat pipes is provided with a plurality of annular heat discharging fins mounted on both heat pipe end portions projected from each of the end plates.

When the slip ring is rotated, heat generated by electric resistance and friction caused between the slip ring and the brushes is transferred to lower temperature portions. Namely, the condensed liquid is evaporated by the heat generated by the slip ring and the brushes to raise the pressure around the evaporating portions, as a result the vapor generated by the evaporation is transferred to both the cooled ends with the fins by the pressure difference between the evaporation portions and the cooled ends. The vapor is condensed there, and returned to the evaporation portions, thus the heat is transferred from the evaporation portions to the condensation portions, whereby, theoretically, the heat generated by the brushes and the slip ring is axially transferred to be dispersed effectively, and the heat balance is effected rapidly.

However, practically, since the pipes exist in the heat passages to extend from the heat generation portions to the condensed liquid, the heat transfer in the radial direction is not effected enough, so that the slip ring and the brushes are not cooled well enough. Therefore, in order to increase pressure difference in the heat passage, it is necessary to supply a large amount of a cooling gas to the fins or to make the fins larger. However, it would make the electrical rotary machine larger and its construction complicated, so that it is not practical.

Further it is known that instead of the heat pipes, the side walls of axial holes made axially in the peripheral portion of the slip ring are used for containing therein the condensed liquid, and outer pipes with fins are mounted on the side portions of the slip ring so as to align with the axes of the holes. The outer pipes have openings made in the ends for supplying the condensed liquid into the holes and discharging it out of the holes. The openings are sealed with plugs. In this construction, the heat generated by the brushes and the slip ring is conducted directly to the condensed liquid enclosed in the axial holes so that the heat is dispersed effectively, and it is an improvement that also makes the temperature uniform.

As material of the slip ring, high carbon steel which is great in mechanical strength and wear-resistance is used, but the material is corrosive. In the electrical rotary machines such as turbine generators which have a long life cycle, attention must be payed to corrosion in order to keep the reliability because the corrosion may occur at the portions which are subjected to high temperature and high stress. Therefore a corrosion-preventing agent is admitted in advance in the condensed liquid. In order to check the condensed liquid or exchange it, openings are provided. Usually the condensed liquid is checked or exchanged at the time of periodical check of the electrical rotary machine, done every 1 or 2 years at a fixed time.

In this case, there is a serious problem as for allotment of an amount of the condensed liquid to the individual pipe or hole. Namely, in an electrical rotary machine rotating at a high speed such as the turbine generator, even when the condensed liquid is alloted a little unequally to the closed chambers the unbalanced condensed liquid amount makes violent vibration, which causes a serious accident such as stopping the operation. Therefore, close attention is directed to even allotment of the condensed liquid to the individual closed chamber, but it is not easily worked out, particularly in case of the electrical rotary machine of large capacity provided with a plurality of the closed chambers. Further, in order to keep the closed chambers liquid-tight, the sealing construction is made complicated and large-sized because it is rotated at a high speed. Therefore, the parts of the closed chamber which are projected out of the side of the slip ring are bars to checking the brushes or exchanging operation of them and a danger to operators.

SUMMARY OF THE INVENTION

An object of the invention is to provide slip ring cooling devices for electrical rotary machines which can cool the slip ring effectively and uniformly.

Another object of the invention is to provide slip ring cooling devices for electrical rotary machines which do not cause unstable vibration.

Further, another object of the invention is to provide slip ring cooling devices for electrical rotary machines which have constructions in which condensed liquid is allotted evenly to an individual closed chamber formed in the slip ring for enclosing liquid and its vapor therein.

Still further, another object of the invention is to provide a slip ring cooling device for an electrical rotary machine in which only little portions are projected out of the side of the slip ring.

Briefly stated, in the invention a slip ring has an annular liquid passage formed therein and communicating with a plurality of closed axial chambers each formed in the peripheral portion of the slip ring, so that centrifugal force due to the rotation of the slip ring, applied on condensed liquid enclosed in the annular liquid passage can allot the condensed liquid to the individual closed chamber.

DESCRIPTION OF THE PREFERRED EMBODIMENT

An embodiment of a slip ring cooling device for a turbine generator as an electrical rotary machine according to the invention will be described hereinafter in detail, referring to FIGS. 1 and 2.

Figure 1:
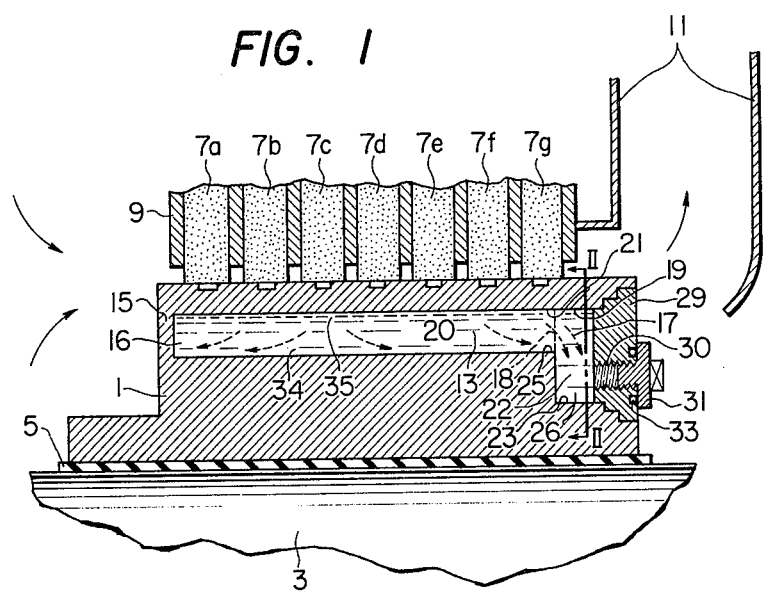
FIG. 1 is a sectional view of an embodiment of a slip ring cooling device for an electrical rotary machine according to the invention.
Figure 2:
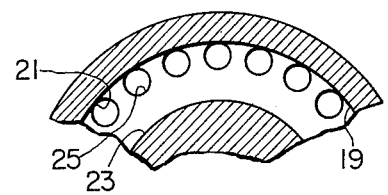
FIG. 2 is a sectional view of a slip ring taken along a line II—II in FIG. 1.

In FIG. 1, a slip ring 1 is rigidly mounted on a rotor shaft 3 provided with an electrical insulator 5. On the slip ring 1, a plurality of brushes 7a to 7g are disposed which are held by a brush holder 9. Contacting portions between the slip ring 1 and the brushes 7a to 7g are cooled by a forced draft cooling means. The cooling means includes a cooling fan (not shown) mechanically connected to the rotor shaft 3 and a guide 11, and causes a cooling gas to flow from one side toward the other side of the slip ring 1, and shown by arrows. The cooling gas after cooling the slip ring 1, the brushes 7a to 7g, etc. is discharged out of the generator through the guide 11.

In the peripheral portion of the slip ring 1, a plurality of holes 13 are formed, with equal peripheral distances therebetween. Each of the holes 13 extends axially from the brush 7g side to the brush 7a side and terminates at the brush 7a side, with the side portion 15 left, thereby to provide a closed end. At the other end 18 of the holes 13, an annular recess 17 is formed. The outer face 19 of the recess 17 aligns to the outer face 21 of the hole 13, and the inner face 23 extends inwardly beyond the inner face 25 of hole 13, so that the inner portion 26 of the recess 17 can be a reservoir 26 for liquid. The annular recess 17 is closed by a lid 29 so that the plurality of holes 13 each form closed chambers 20, and the annular recess 17 forms a liquid passage 22 communicating with each of the closed chambers 20. The lid 29 is inserted in an annular groove formed in the end portion of the slip ring 1, and provided with a plug 31. The plug 31 is inserted in an opening 30 provided in the lid 29 and secured sealingly thereto through a packing 33. It is preferable to make the reservoir of passage 22 wider in the viewpoint of heat exchanging. One or two pairs of opening 30 and the plug 31 are provided on the lid 29 for supplying condensed liquid into the liquid passage 22.

In this construction of the slip ring cooling device, the condensed liquid poured from the opening 30 into the passage 22 is reserved in the lower portion 26 of the liquid passage due to the weight of the liquid itself when the generator is stopped. When the slip ring 1 is rotated by operating the generator, centrifugal force is applied on the condensed liquid, and liquid is moved outward. Namely the liquid flows toward the peripheral portion of the slip ring 1 and it is distributed uniformly to the individual closed chamber 20 by the centrifugal force applied on the liquid. The condensed liquid in the closed chamber 20 is kept at the same level as that in the other closed chambers 20. Under this condition, the condensed liquid is evaporated with the heat generated by the brushes 7a to 7g and the slip ring 1 to generate vapor. The vapor flows as shown by arrows with broken lines and it is condensed to liquid at the inner side 34 of the closed chamber 20 and in the reservoir 26. The condensed liquid again flows toward the outer side 35 and is distributed to each of the closed chambers 20 by the centrifugal force.

The reservoir 26 serves as extension of the space for containing the liquid and vapor evaporated as well as the expansion of the surface of the portion where the liquid is evaporated. It is promoted to transfer the heat generated by the brushes 7a to 7g and the slip ring 1. Namely, the extension of the space makes the evaporation more easy as compared with a smaller space with the same amount of the condensed liquid because the pressure rise due to the evaporation is less. The heat, which is discharged at the axial end portions of heat pipes in the prior art, is discharged in a radial direction, also in this embodiment. By the extension of the heat discharging surface, namely by the liquid passage portion, heat discharge can be effected so that approximately the same effect as that of a conventional cooling device with fins at the both ends can be obtained.

In this construction of the slip ring cooling device, the condensed liquid poured from one or two of the openings 30 can be distributed uniformly into each of the closed chambers 20. Therefore, pouring can be worked very easily. The space for containing the condensed liquid and its vapour, and the surface contacting with the vapour are extended so that the effect of the heat discharge is enhanced. Projecting portions from the side faces of the slip ring 1 are minimized, that is only one or two of the plug 31 are projected, so that dangers at the time of maintenance of the brushes 7a to 7g can be avoided.

The liquid passage 22 can be provided at either side of the slip ring 1 or at both the sides, but it is preferable to provide the liquid passage 22 at the downstream side with respect to the coolant flow due to the forced cooling means so that the effect of the heat discharge can be made more uniform.

Figure 3:
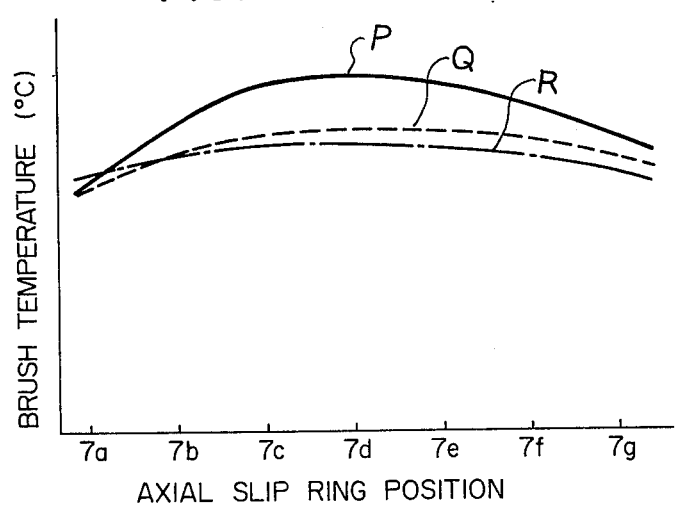
FIG. 3 is a graph showing relations of brush temperature to slip ring axial positions.

In FIG. 3, the comparisons between the prior art and this embodiment of the slip ring cooling device are shown, with respect to the relations of the brush temperature to the slip ring axial positions 7a to 7g.

A curve P shows the above-mentioned relation in the prior art cooling device which have a plurality of heat pipes with fins, as described in the background of the invention.

A curve Q shows the same relation as above-mentioned in a conventional slip ring cooling device which has axial holes made in the slip ring for enclosing condensed liquid, and outer pipes with fins mounted on the sides of the slip ring. A curve R is the same relation as above-mentioned in the embodiment of the invention. It is noted that the curve R is flat. This means that the condensed liquid is evaporated well enough, and the vapor is transferred substantially to the lower temperature portion.

According to the present invention, the condensed liquid is distributed uniformly to the individual closed chamber, so that abnormal vibration due to the condensed liquid unbalance poured can be avoided.

What is claimed is:

1. An electrical rotary machine, comprising:
   an annular slip ring having a peripheral portion and axially opposite side portions;
   a plurality of chambers formed in said slip ring at the peripheral portion of said ring with intervals in the peripheral direction, for enclosing cooling liquid and its vapor, said chambers each extending axially from one end at one side portion of said slip ring to an opposite end at the other side portion;
   common passage means, provided at the one side portion of said slip ring and fluid communicating with only the one end of each of said plurality of chambers;
   means fluid sealing the remainder of each of said chambers;
   means hermetically sealing liquid volatile at the working temperature of said slip ring and its vapor within said communicating passage means and chambers;
   said passage means including an annular passage that extends radially outward substantially at least as far as the radially outermost portions of said chambers and that extends radially inward a substantial distance beyond the radially innermost portions of said chambers;
   said passage means providing an outer axial free liquid flow path for liquid coolant freely from said annular passage to said one end of each of said chambers, that is substantially at the radius of the radially outermost portions of said chambers, and further providing an inner axial free liquid flow path from the one end of said chambers to said annular passage at substantially the same radius as the innermost portions of said chambers;
   means providing cooling for the liquid within said annular passage; and
   said passage means uniformly distributing the cooled liquid from said annular passage along said outer path to each of said chambers by centrifugal force applied on the liquid by the rotation of said slip ring so that the liquid may travel axially from said one end to said other end along the outermost portions of each of said chambers to be heated and partially vaporized, so that heated liquid and its vapor will travel axially along the inner portions of said chambers from said other end to said one end through a lower path and into said annular passage, and said annular passage will receive gases within its innermost portion generally radially inward of said chambers so that the vapor is condensed and the liquid cooled in said annular passage for recirculation to said chambers.

2. The device according to claim 1, further including selectively closeable inlet means for pouring the liquid into at least one of said chambers and said passage means.

3. The device according to claim 2, wherein each of said chambers being defined by the face of a hole made in the peripheral portion of said slip ring, said hole having a closed end and an open end, and said passage means is fluidly connected to said open end of said hole.

4. The device according to claim 3, wherein said annular passage comprises an annular recess formed in the one side portion of said slip ring, and said sealing means including a lid covering said recess.

5. The device according to claim 4, wherein said annular liquid passage has a rectangular shape in a plane taken along the axis of said slip ring, and the outer face of said annular liquid passage aligns to the outer face of each of said holes.

6. The device according to claim 4, wherein said inlet means includes an opening in said lid extending axially and a plug sealingly mounted in said opening.

7. The device according to claim 4, wherein said lid is provided within the side face of said slip ring.

8. The device according to claim 1, including guide means for passing a cooling gas axially in one direction along the outer periphery of said slip ring; and
   wherein said passage means is provided at the side portion of said slip ring downstream of the other end with respect to the cooling gas flowing axially along said slip ring.

9. The cooling device according to claim 1, wherein each of said chambers is substantially identical, said chambers are located at the same radial distance from the axis of rotation of said slip ring, and said chambers are equally spaced from each other peripherally around said slip ring.

10. The cooling device according claim 9, wherein each of said chambers is defined by a blind bore within said slip ring to form a closed end and open end, with the surface being in direct contact with said liquid; said passage means being fluid connected directly to each open end of said bores.

11. The device according to claim 10, further including guide means for passing a cooling gas axially in one direction along the outer periphery of said slip ring, from said other side portion to said one side portion, so that additional cooling is provided by said passage means at the downstream end of the cooling gas flow to substantially offset the loss in cooling effect of the cooling gas as it increases in temperature during its axial flow across the slip ring outer periphery.

12. The device according to claim 9, further including guide means for passing a cooling gas axially in one direction along the outer periphery of said slip ring, from said other side portion to said one side portion, so that additional cooling is provided by said passage means at the downstream end of the cooling gas flow to substantially offset the loss in cooling effect of the cooling gas as it increases the temperature during its axial flow across the slip ring outer periphery.

13. The device according to claim 1, further including guide means for passing a cooling gas axially in one direction along the outer periphery of said slip ring, from said other side portion to said one side portion, so that additional cooling is provided by said passage means at the downstream end of the cooling gas flow to substantially offset the loss in cooling effect of the cooling gas as it increases in temperature during its axial flow across the slip ring outer periphery.

* * * * *